(12) United States Patent
Thomson et al.

(10) Patent No.: US 6,505,381 B1
(45) Date of Patent: Jan. 14, 2003

(54) PULLEY ACTUATED TRANSLATIONAL HINGE SYSTEM

(75) Inventors: Mark Thomson, Ventura, CA (US); Steve Davis, Ventura, CA (US)

(73) Assignee: TRW Astro Aerospace, Carpenteria, CA (US)

( * ) Notice: Subject to any disclaimer, the term of this patent is extended or adjusted under 35 U.S.C. 154(b) by 0 days.

(21) Appl. No.: 09/629,582

(22) Filed: Jul. 31, 2000

Related U.S. Application Data

(60) Provisional application No. 60/146,630, filed on Jul. 30, 1999.

(51) Int. Cl.[7] ................................ E05F 1/08; E05F 1/14
(52) U.S. Cl. .......................... 16/302; 16/282; 16/286; 16/291; 16/306; 16/362; 49/332; 49/399
(58) Field of Search ....................... 16/362, 302, 306, 16/281, 282, 286, 287, 288, 291; 49/379, 347, 332, 331, 399, 386; 160/9, 135, 188, 193; 244/173, 158 R

(56) References Cited

U.S. PATENT DOCUMENTS

| | | | | |
|---|---|---|---|---|
| 4,373,690 A | * | 2/1983 | Stillman et al. | 136/245 |
| 4,393,541 A | * | 7/1983 | Hujsak et al. | 16/291 |
| 4,491,446 A | * | 1/1985 | Ewald | 136/245 |
| 4,924,626 A | * | 5/1990 | Ts'ao | 49/280 |
| 5,271,652 A | * | 12/1993 | Watanabe et al. | 16/289 |
| 5,664,290 A | * | 9/1997 | Scherrer | 16/287 |
| 5,785,280 A | * | 7/1998 | Baghdasarian | 136/245 |

* cited by examiner

*Primary Examiner*—Chuck Y. Mah
(74) *Attorney, Agent, or Firm*—Knobbe Martens Olson & Bear LLP

(57) ABSTRACT

A hinge system for deploying panels or other structures from a satellite or spacecraft has at least two configurations. The panels are held in a substantially stacked disposition in the stowed configuration by the hinge system which connects to each panel and includes an intermediate arm sized to span any necessary space between the two panels in the stowed configuration. A deployment cable is attached to one of the panels and threaded over a series of pulleys disposed on the hinge system and onto a spool in the other panel. When the spool is driven to wind the deployment cable onto it, the tension in the cable pulls on the pulleys, causing the hinge to unfold and then slide into a housing located on one of the panels. This deployed configuration allows the panels to be held aligned and directly adjacent to one another by the tension of the deployment cable.

7 Claims, 7 Drawing Sheets

PULLEY ACTUATED TRANSLATIONAL HINGE SYSTEM

RELATED CASES

This application claims priority under 35 U.S.C. §119(e) from Provisional Application No. 60/146,630, filed Jul. 30 1999.

BACKGROUND OF THE INVENTION

1. Field of the Invention

The present invention relates to spacecraft. In particular, the present invention relates to a hinge mechanism for deploying components of a spacecraft.

2. Description of the Related Art

Satellites are generally designed for two different environments.. The first is the environment to which the satellite will be subjected during launch. At launch, a satellite must be packed into a launch vehicle, generally requiring that the satellite fit within some specific confined space. During launch, a satellite is often subjected to high physical stresses such as g-loading and vibration.

The second environment is the orbital environment. Unlike the launch environment, once in orbit the satellite is generally subjected to very light force loading and vibration, if it is subject to any at all. Furthermore, the structure may generally be large or unwieldy in this environment without any adverse effect, since there are generally no size constraints or physical loads imposed by gravity or air resistance upon the satellite once deployed.

Because of the difference between these two environments, it is common to design satellites and other components of spacecraft such that they have two different configurations: one used for launch and one used while in orbit. This allows the designer of the satellite or spacecraft to take advantage of the greater design flexibility available in the orbital environment, while still providing a robust design that fits within the necessary physical limits required for the launching process.

In order to adjust the satellite from one configuration to the other, it is common to use collapsible members, hinges, and other moving parts. There is therefore a need for continued development of improved devices such as hinges to facilitate the transformations of satellites from their launch to their orbital configurations.

SUMMARY OF THE INVENTION

In one preferred embodiment of the present invention, a hinge mechanism is constructed which allows a base panel and a folding panel to be deployed from a stowed configuration into a deployed configuration. In the stowed configuration, the panels face each other and are connected by the hinge mechanism which attaches to a lateral edge of each panel. Other panels may be disposed in-between the two panels. The hinge is connected to the folding panel by a first arm and to the base panel by a second arm which is connected to a telescope fitting which slides within a telescope housing mounted within the base panel. A cable is threaded from the folding panel through the hinge mechanism and over a number of pulleys which are disposed upon the arms of the hinge mechanism. The cable is then threaded along the telescope housing and onto a cable spool. The spool is driven by an actuator in order to control the tension in the cable.

When the actuator is used to increase the tension in the cable, the hinge mechanism unfolds, rotating the folding panel with respect to the base panel. When the rotation is complete, the hinge mechanism is drawn into the telescope housing by the tension of the cable, pulling the folding panel snugly against the base panel such that their connected lateral edges now press against one another. In this deployed configuration, the panels are disposed so that no gap is left between the sides of the panels.

BRIEF DESCRIPTION OF THE DRAWINGS

The above mentioned and other features of the invention will now be described with reference to the drawings of a preferred embodiment of the present hinge system. The illustrated embodiment of the hinge system is intended to illustrate, but not to limit the invention. The drawings contain the following figures.

DETAILED DESCRIPTION OF THE PREFERRED EMBODIMENT

The following description and examples illustrate a preferred embodiment of the present invention in detail. Those of skill in the art will recognize that there are numerous variations and modifications of this invention that are encompassed by its scope. Accordingly, the description of the preferred embodiment should not be deemed to limit the scope of the present invention.

Overview

Figure 1:
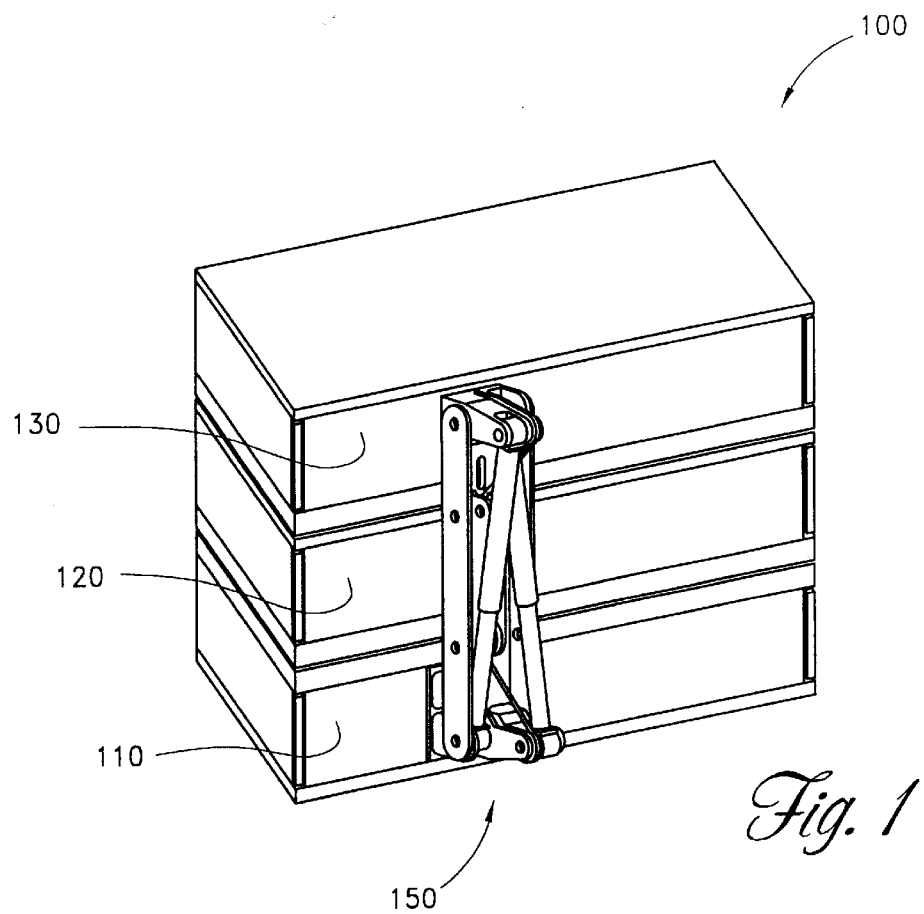
FIG. 1 illustrates a folding panel array which comprises three panels in the stowed configuration and uses one preferred embodiment of the present invention.
Figure 2:
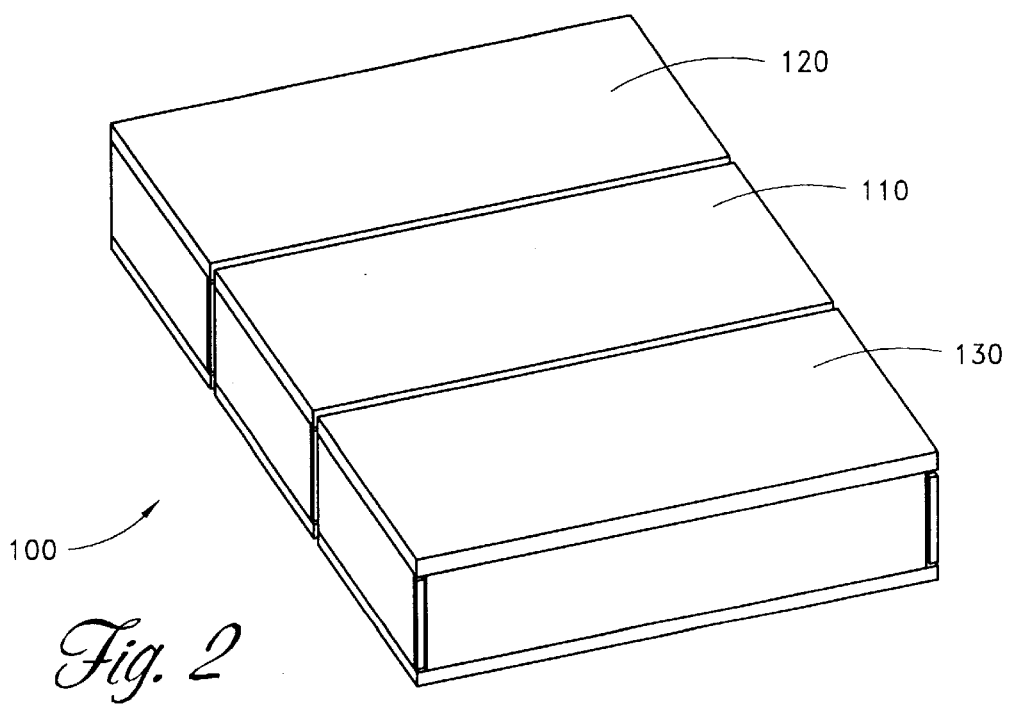
FIG. 2 illustrates the folding panel array of FIG. 1 in the deployed configuration.

In FIG. 1, we can see a typical installation of one preferred embodiment. The hinge is shown in use upon a deployable panel array 100 comprising a set of panels 110, 120, 130 which can be deployed into an unfolded configuration as shown in FIG. 2. These panels could be part of a solar panel array, an antenna array or another system which requires deployment from a stowed configuration to a deployed configuration. Those of skill in the art will also recognize that the panels need not be limited to two folding panels nor merely rectangular panels. The hinge mechanism described below is a structure which is used to move the arms connected to the panels with respect to one another. The arms of this mechanism are attached to the panels which are to be articulated using the hinge mechanism.

The base panel 110 is the lowest panel shown in FIG. 1 and will form the center of the unfolded array 100. The base panel may be mounted to the remainder of the satellite or spacecraft, and serves as an anchor for the deployable panels 120, 130. Those skilled in the art will recognize that there is no need for the base panel 110 to be located centrally in the folding array; however, all rotations and translations will be considered herein as if the base panel were fixed and the other parts were moving with respect to the base panel.

Attached to the base panel 110 in the exemplary deployable panel array 100 shown in FIGS. 1 and 2 are two hinges. One is visible in FIG. 1 connecting the base panel 110 and the outer panel 130. Another hinge (not shown) is located on the opposite side of the array 100 and connects the base panel 110 to the inner panel 120. Note that the hinge which is visible in FIG. 1 spans the space occupied by the inner panel 120 without connecting to this inner panel.

As shown in FIG. 1, the base panel 110 and the outer panel 130 are separated by the space occupied by the inner panel 120. If the outer panel were unfolded using a hinge which merely rotated, it would not lie flush with the base panel in the unfolded position. However, as shown in FIG. 2, the deployed position of the array 100 allows the panels to lie directly adjacent to one another when the hinge system of one preferred embodiment of the present invention is used, even though the hinge spans the space occupied by other panel in the stowed configuration.

Although the configuration shown in FIG. 2 shows a linear array of rectangular panels, those of skill in the art will recognize that the present invention is equally applicable to the use of deployments other than that shown. For example, the panels need not deploy through a full 180° of rotation. It may be advantageous when designing antennas or other structures for the final shape to include angles between the various panels. For instance, in deploying an array of concentrating reflectors it may be advantageous to form a surface which has a parabolic or other concave shape. This may be accomplished by deploying panels or other structures which unfold less than 180° from their original position.

It may also be desirable that there are more than three total panels. For instance, a hexagonal array consisting of six hexagonal panels connected to a single central hexagonal base panel may be advantageous in applications requiring a large increase in area between the stowed and deployed configurations. Other geometries will also be apparent to those of skill in the art.

Structure

Figure 3:
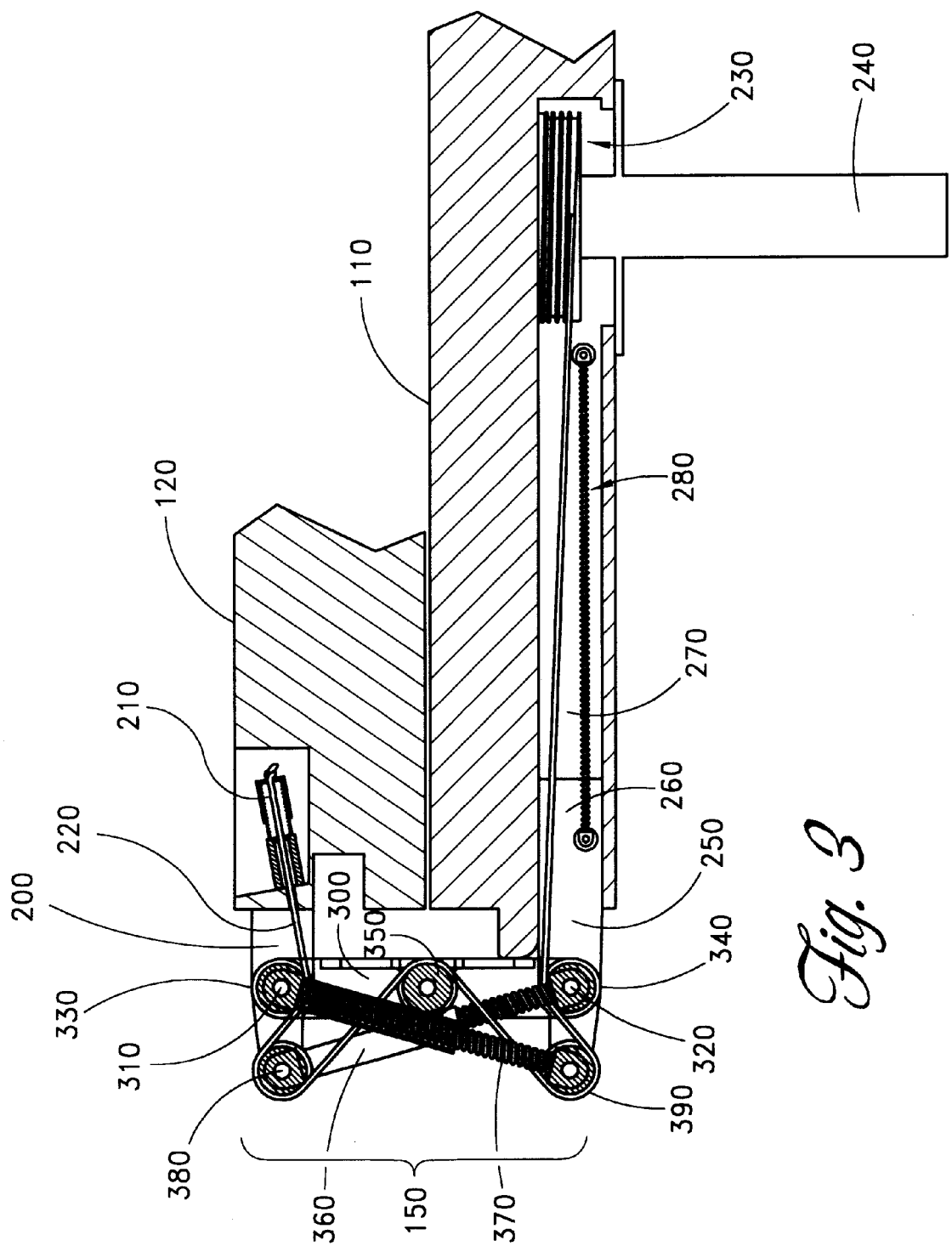
FIG. 3 illustrates a partial cut away side view of a hinge system in accordance with one preferred embodiment of the present invention in the stowed configuration.
Figure 4:
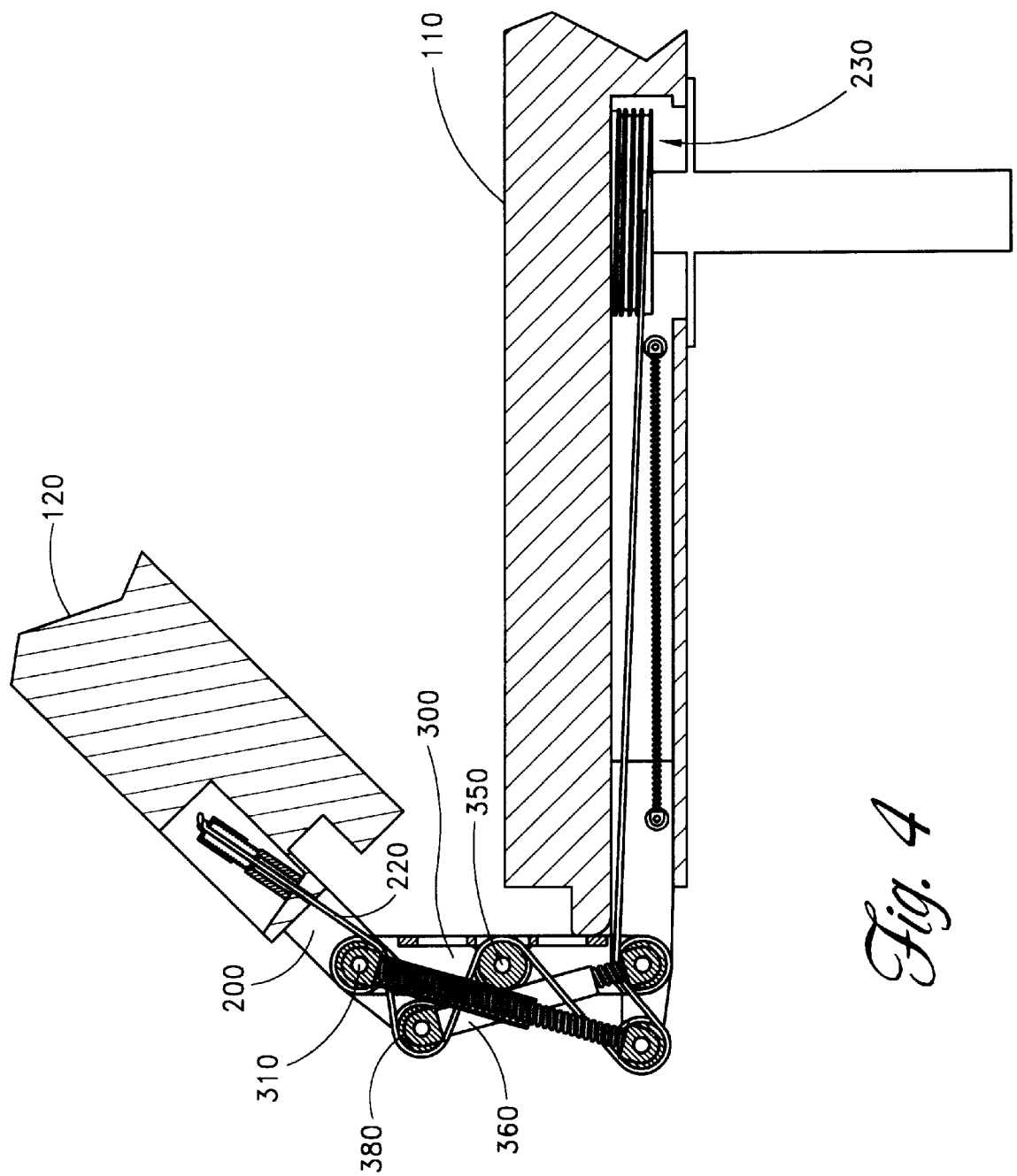
FIG. 4 illustrates a partial cut away side view of the hinge system of FIG. 3 in the process of unfolding about the first rotating joint.

FIG. 3 shows a partial cross sectional side view of a hinge in accordance with a preferred embodiment of the present invention. For simplicity, the following discussion and FIGS. 3–8 will describe the design and operation of a single hinge mechanism in accordance with one preferred embodiment of the present invention. A hinge which does not span an intervening panel will be shown, consistent with the hinge that is used between the base panel 110 and the inner panel 120 of the array 100 of FIGS. 1 and 2. However, this same design will apply equally to hinges which do span intervening panels in all respects except for the relative dimensions of the components, as will be discussed below.

The base panel 110 and inner panel 120 are connected by the hinge mechanism 150 which is disposed adjacent to a lateral end of each panel. The upper portion of the hinge mechanism 150 attaches to the inner panel 120. An inner panel arm 200 comprises part of the hinge and is rigidly connected to the inner panel 120. The inner panel also contains an anchor 210 to which one end of a deployment cable 220 is fastened.

The deployment cable 220 is threaded through the hinge mechanism 150 and onto a spool 230 which is disposed inside the base panel 110. The spool 230 is connected to a shaft 240 which is driven by a motor (not shown). The motor should advantageously provide either precise rotation control of the driving shaft or precise control over the level of torque applied to the driving shaft. One preferred means of providing the required rotational control is to use a stepper motor. The spool, shaft and motor collectively form the actuator of the hinge mechanism. The actuator is used to control the length of the deployment cable 220 as well as the tension within the deployment cable. Other actuators as are known in the art may be used to control the length and tension of the deployment cable.

The lower portion of the hinge 150 comprises a base panel arm 250 which is connected to a telescope fitting 260. The telescope fitting is slidably connected to a telescope housing 270 which is disposed within the base panel 110 itself. The telescope housing is advantageously dimensioned so that the telescope fitting 260 and hinge 150 can be slidably inserted within the telescope housing 270 when the hinge is in the unfolded configuration as described below. A spring 280 is disposed between the telescope housing and telescope fitting to resist the inward motion of the telescope fitting 260.

The hinge 150 shown in FIG. 3 comprises in part an intermediate arm 300 which is connected to the inner panel arm 200 by a first rotating joint 310 and to the base panel arm 250 by a second rotating joint 320. A first joint pulley 330 is located at the first rotating joint, and a second joint pulley 340 is located at the second rotating joint. An additional center pulley 350 is located on the intermediate arm 300 between the first rotating joint and the second rotating joint.

The hinge 150 also comprises a pair of compression springs, a first compression spring 360 which connects the inner panel arm 200 and the second rotating joint 320 of the intermediate arm 300, and a second compression spring which connects the base panel arm 250 and the first rotating joint 310 of the intermediate arm 300.

Note that the connection of the compression spring 360 to the folding panel arm 200 occurs at a position along the outer part of the folding panel arm, i.e. at a position which is located further from the folding panel 120 than the first rotating joint 310. This allows the compression spring 360 to bias the connection between the folding panel arm 200 and the intermediate arm 300 such that this joint tends to remain in the stowed configuration (i.e. with the folding panel arm and intermediate arm oriented perpendicular to each other). A first tensioning pulley 380 is also disposed upon the outer portion of the folding panel arm 200.

Similarly, the compression spring 370 is connected to the base panel arm 250 at a location upon the outer portion of the base panel arm to allow the spring 370 to bias the base panel arm and intermediate panel arm 300 toward the stowed configuration. A second tensioning pulley 390 is disposed upon the outer portion of the base panel arm 250.

The deployment cable 220 is threaded from its anchor 210 within the inner panel 120 over the five pulleys of the hinge 150. As shown in FIG. 3, it passes over the first joint pulley 330, the first tensioning pulley 380, the center pulley 350, the second tensioning pulley 390, and then the second joint pulley 340. The cable 220 then leads along the length of the telescope housing 270 and onto the spool 230.

Because the first and second rotating joints 310, 320 and the telescope fitting 260 allow the structure to move, there is a range of configurations in which the hinge system may be arranged. These configurations are defined primarily by the angle between the inner panel arm 200 and intermediate arm 300, the angle between the intermediate arm 300 and the base panel arm 250, and the distance the telescope fitting 260 extends from the telescope housing 270.

When the angle between the arms is greatest (furthest from the arms being aligned with one another) and the telescope fitting is extended as far as possible, the system is said to be in the "stowed" or "folded" configuration. This is the configuration in which the panels 110, 120 will lie folded over one another as will be desirable when the system is being packaged for launch or reentry. The springs 280, 360, 370 provide a bias to the rotating joints and the telescope fitting such that this is the position that will held by the hinge system in the absence of tension in the deployment cable 220 sufficient to overcome these biases.

Figure 8:
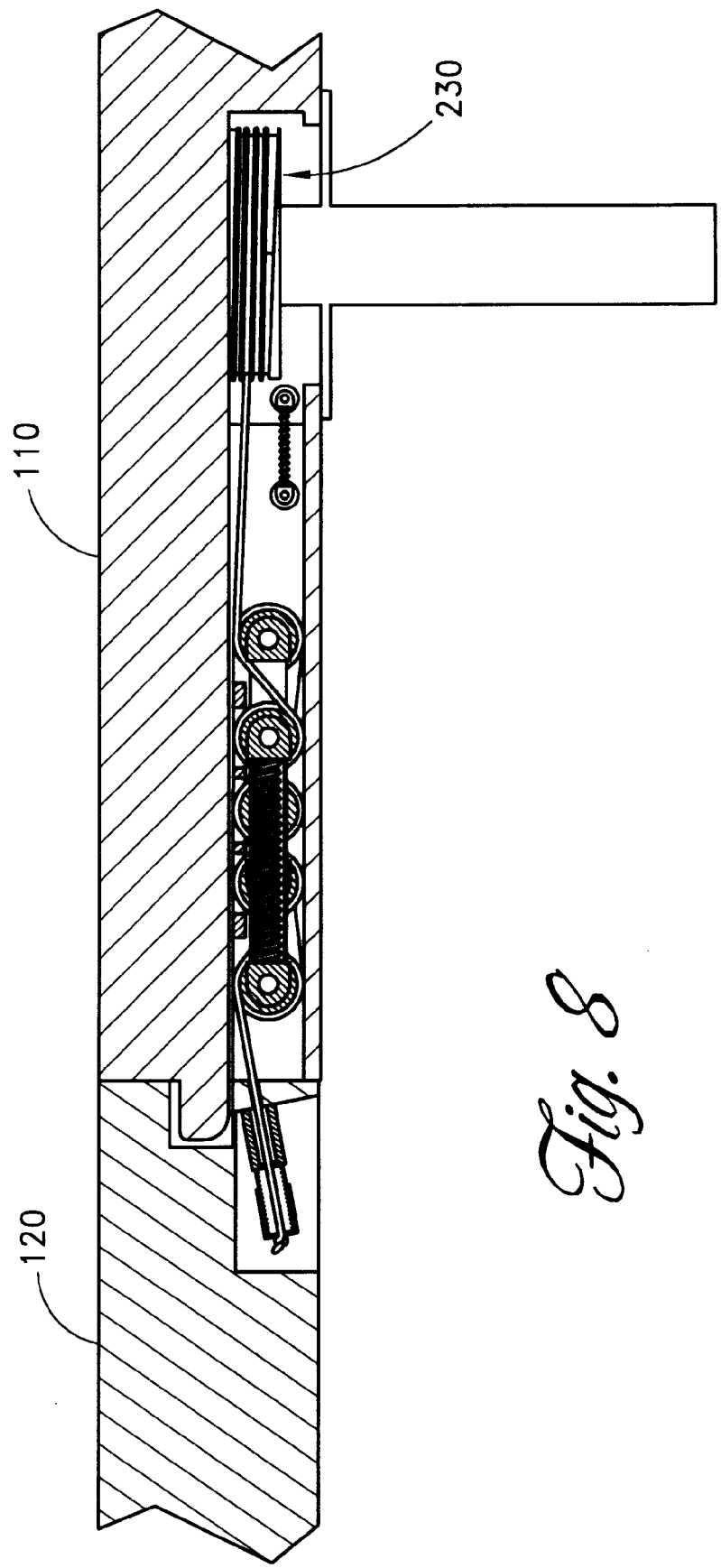
FIG. 8 illustrates a partial cut away side view of the hinge system of FIG. 3 in the fully deployed position after full translation of the telescope fitting within the telescope housing.

When the angle between the arms is such that the inner panel arm 200, intermediate arm 300 and base panel arm 250 lie substantially parallel and collinear and the telescope fitting 260 is withdrawn into the telescope housing 270 to the maximum extent, the system is said to be in the "deployed" or "unfolded" configuration (see FIG. 8). This configuration is advantageous during use of the systems, such as solar arrays or radio antennas, which are associated with the panels 110, 120. This configuration is achieved by increasing the tension in the deployment cable 220 such that the force of the cable overcomes the biases provided by the springs and the system moves into the deployed configuration as will now be described.

Rotation

In order to deploy the hinge shown in FIG. 3 from the stowed configuration to the deployed configuration, it is necessary to increase the tension in the deployment cable 220 to a level such that it will overcome the force of the springs 280, 360, 370 which are holding the system in the stowed configuration. The tension in the deployment cable may be increased by winding some of the cable 220 onto the cable spool 230 by driving the spool via the attached shaft 240.

The cable 220 is drawn onto the spool 230 as it turns, resulting in less free length of cable threading through the hinge 150. Because the end of the cable 220 is connected to the anchor 210 in the inner panel 120, the cable will begin to stretch and the tension within the cable will increase.

At any time when there is tension in the deployment cable 220, the cable will exert forces on the pulleys around which it is threaded. The force exerted on each pulley is in a direction roughly halfway between the angles at which the cable contacts the pulley. For instance, the force exerted on the center pulley 350 in the stowed configuration (FIG. 3) by the cable 220 is generally normal to the length of the intermediate arm 350, i.e. this force would pull the pulley to the left in FIG. 3. Similarly, the force upon the first tensioning pulley 380 is in a direction generally between the first joint pulley 330 and the center pulley 350.

Although the deployment cable 220 exerts such a force on each of the pulleys of the hinge system, many of the pulleys are not free to move with respect to one another. For instance, the first joint pulley 330 and first tensioning pulley 380 are both fixed in position upon the inner panel arm 200. Therefore, no relative motion is possible between the two pulleys. Similarly, the second joint pulley 340 and the second tensioning pulley 390 are both fixed in position upon the base panel arm 250. The first joint pulley 330, second joint pulley 340, and center pulley 350 are all fixed in position upon the intermediate arm 300, preventing them from moving with respect to one another.

Unlike the pulley combinations listed above, the first tensioning pulley 330 is free to move with respect to the center pulley 350, and the second tensioning pulley 340 is free to move with respect to the center pulley as well. However, motion of these two pulleys due to the tension in the cable is resisted by the forces applied to the pulleys by the first compression spring 360 and second compression spring 370, respectively. These springs are disposed so as to push in a direction which provides a torque in the opposite direction to that which is imposed by the tension in the deployment cable 220.

For example, the first compression spring 360 provides a force between the second rotating joint 320 and the first tensioning pulley 330 that produces a torque between the inner panel arm 200 and intermediate arm 300 which tends to rotate the inner panel arm clockwise about the first rotating joint 310. The tension in the cable 220 tends to pull the first tensioning pulley 330 toward the intermediate arm 300, thereby imposing a torque about the first rotating joint 310 which tends to rotate the inner panel arm counter clockwise about the first rotating joint.

As long as the torque provided by the force of the first compression spring 360 is greater than the torque provided by the tension in the deployment cable 220, the inner panel arm 200 will remain in the position shown in FIG. 3 and will not rotate about the first rotating joint. When the tension in the cable is increased to produce a torque greater than the resisting torque produced by the first compression spring, the inner panel arm will begin to rotate about the first rotating joint (see FIG. 4).

The level of tension which is required can be adjusted by using a compression spring of a different stiffness. A compression spring which is less stiff will result in rotation beginning at a lower cable tension. Therefore, in order to make the hinge system deploy as shown in the sequence of FIGS. 3–8, it is desirable that the first compression spring 360 is less stiff than the second compression spring 370, and that the telescope spring 280 is stiffer than both of the first and second compression springs.

When the motor is used to wind the cable 220 onto the spool 230, the tension in the cable increases. Because the force exerted on each of the pulleys is generally proportional to the amount of tension in the cable 220, this results in greater forces on the pulleys as well. As long as the force exerted on each pulley by the tension in the cable is less than the force exerted by the springs, the system will remain in the stowed configuration (FIG. 3). As a result, farther winding of the cable 220 onto the spool 230 will result in increasing tension within the deployment cable.

At some point, the tension in the cable 220 will become sufficiently great that the force exerted by the cable upon the pulleys will be greater than the force of at least one of the springs which resist the motion of hinge system. If the springs are selected as discussed above such that the first compression spring 360 is generally the least stiff, then this is the spring which will be overcome and begin to compress first. The tension in the cable 220 will pull the first tensioning pulley 380 toward the intermediate arm 300. Because the first tensioning pulley is attached to the inner panel arm 200, this same force in the cable 220 will tend to rotate the inner panel arm 200 about the first rotating joint 310. This is because the only motion possible between the inner panel arm 200 and the intermediate arm 300 takes place around the first rotating joint 310. This will cause the inner panel 120 to begin to move toward the position shown in FIG. 4.

As the panel 120 and arm 200 move, the length of free cable between the spool 230 and the anchor 210 will decrease. This is because the first tensioning pulley 380 will no longer be located as far from the center pulley 350, and so less cable is required to thread over all of the pulleys in the hinge 150. As a result, the tension in the cable 220 will begin to drop unless additional cable is wound onto the spool 230. If the tension in the cable is allowed to drop below the level required to overcome the force of the first compression spring 360, the rotation about the first rotating joint 310 will cease, and the hinge will stop unfolding.

Figure 5:
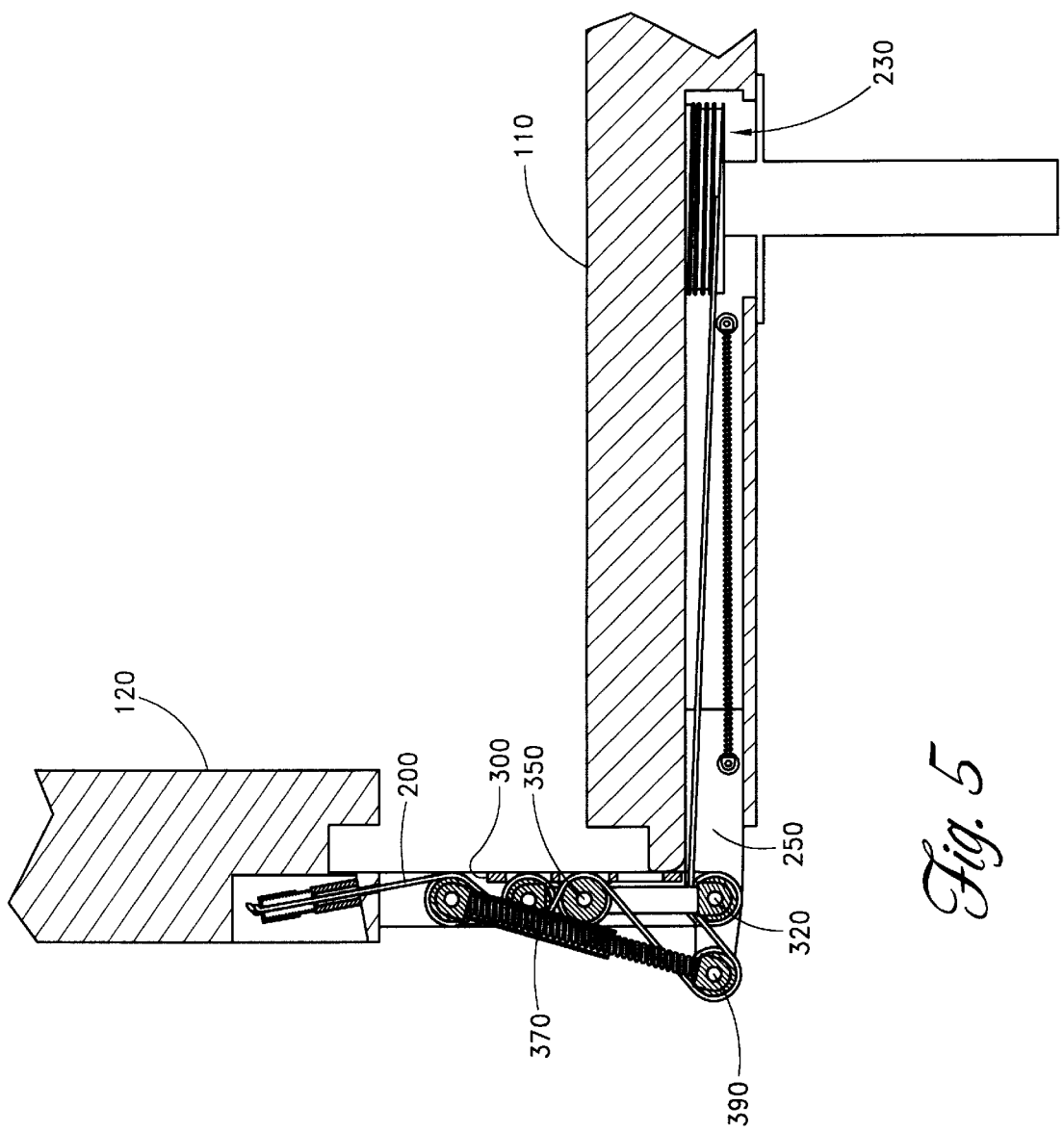
FIG. 5 illustrates a partial cut away side view of the hinge system of FIG. 3 after completion of unfolding about the first rotating joint.
Figure 6:
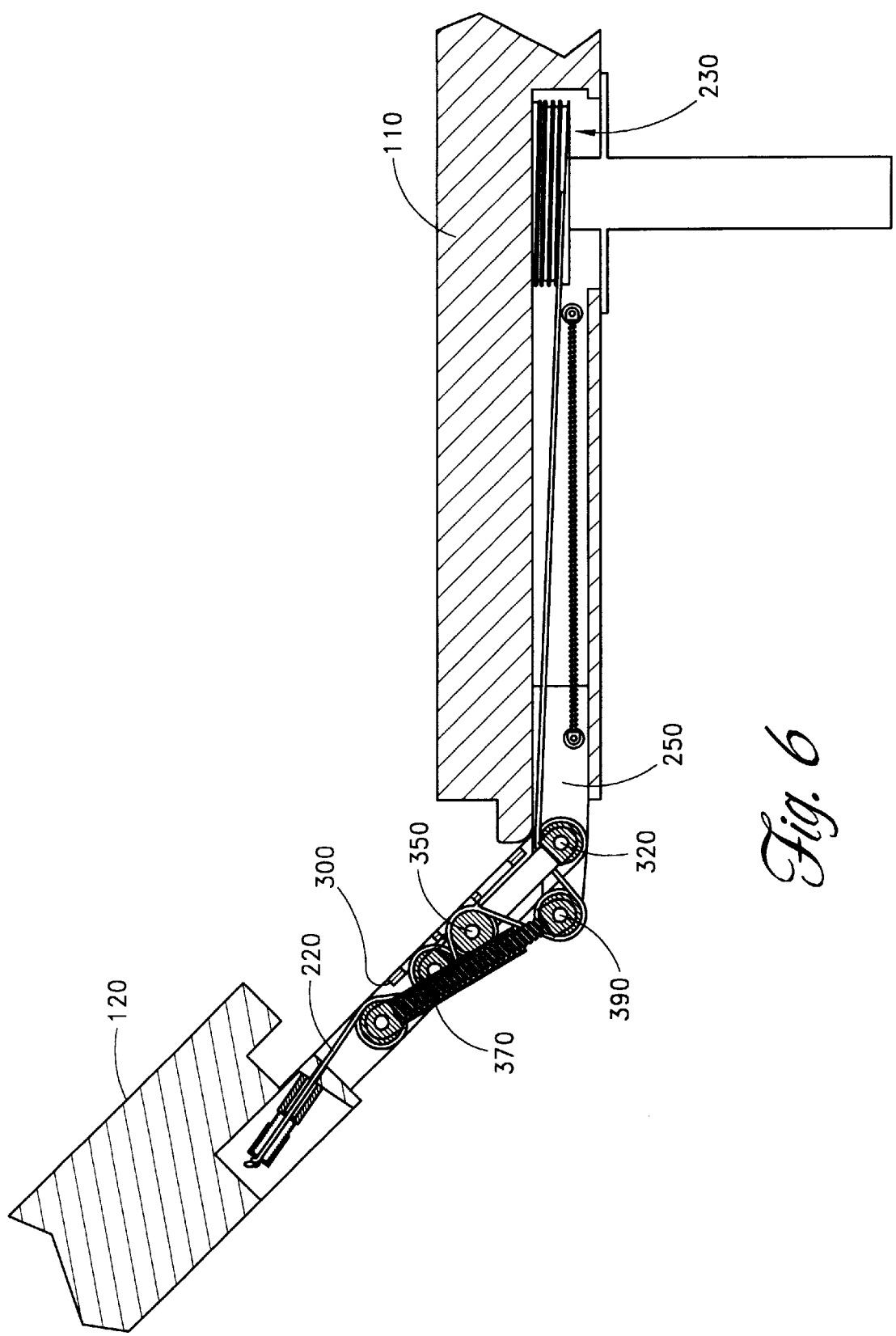
FIG. 6 illustrates a partial cut away side view of the hinge system of FIG. 3 in the process of unfolding about the second rotating joint.

However, if the actuator is used to maintain a constant tension on the deployment cable 220, the cable will continue to exert a force upon the first tensioning pulley 380 and the rotation will continue about the first rotating joint 310 until the position in FIG. 5 is reached. At this point, the mechanical limit of rotation about the first rotating joint 310 is reached, and no further rotation between the inner panel arm 200 and the intermediate arm 300 is possible. The inner panel arm and the intermediate arm now lie substantially parallel and collinear.

At this point, any farther winding of the deployment cable 220 onto the spool 230 will again increase the tension in the cable because there is no motion that can be made until the biasing force of the second compression spring 370 is overcome. At the time when this force is overcome, the second tensioning pulley 390 will begin to move toward the center pulley 350, causing the intermediate arm 300 to rotate counterclockwise about the second rotating joint 320 with respect to the base panel arm 250. This will tend to move the hinge to the configuration shown in FIG. 6.

The rotation around the second rotating joint 320 takes place in an analogous manner to the rotation about the first rotating joint 310 described above. The second tensioning pulley 390 will be moved toward a position in line with the center pulley 350 and second joint pulley 340. (This motion is shown as if the base panel 110 were fixed and the hinge 150 and inner panel 120 were moving in FIGS. 6 and 7, but the relative motions of the arms are the same as those described with reference to FIGS. 4 and 5 above.) As long as the tension maintained in the deployment cable 220 is greater than that required to overcome the torque imposed by the second compression spring 390, the intermediate arm 300 and base panel arm 250 will rotate about the second rotating joint 320 until the position shown in FIG. 7 is achieved, at which point further rotation of the arms is limited mechanically and the system is unable to rotate any further.

Figure 7:
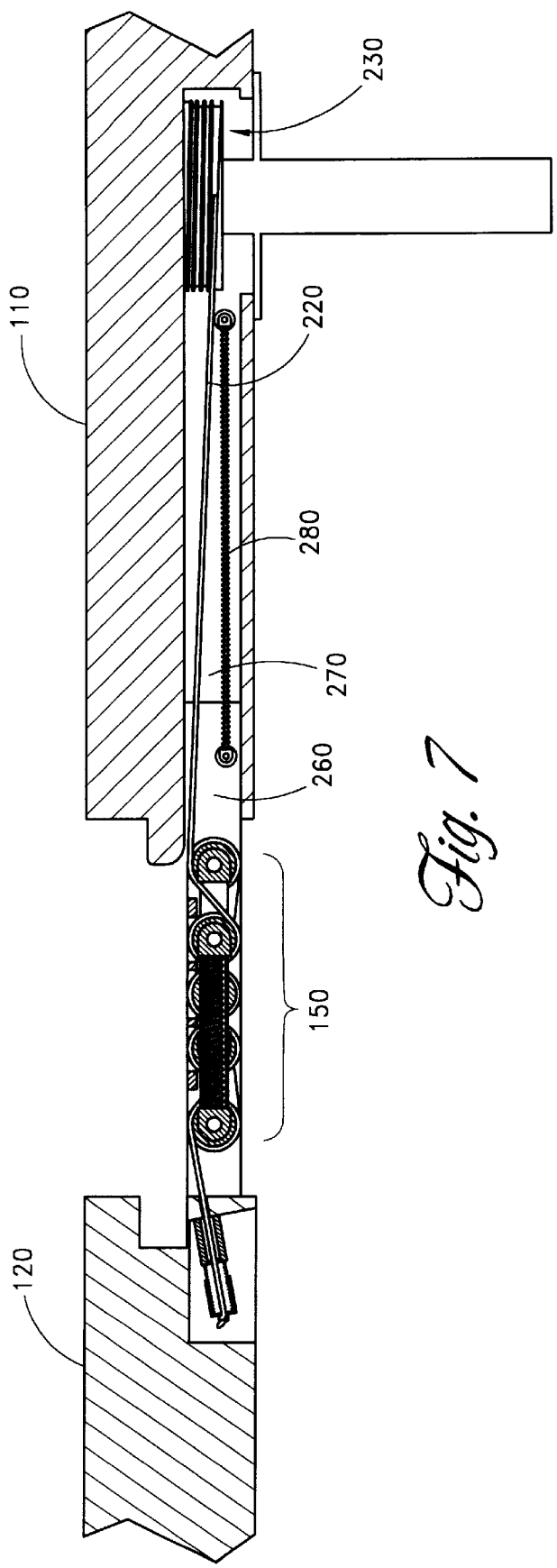
FIG. 7 illustrates a partial cut away side view of the hinge system of FIG. 3 after completion of unfolding about the second rotating joint.

Once the configuration shown in FIG. 7 is reached, the rotation about both rotating joints in response to the tension in the deployment cable 220 is complete and the panels 110, 120 are in substantially their final orientation. The tension in the deployment cable is maintained to prevent the panels from reversing their rotation under the forces of the compression springs 360, 370. However, the panels are still not adjacent to one another; there is a lateral gap between the base panel 110 and the inner panel 120.

Translation

From this configuration, the actuator is used to increase the torque on the cable spool 230 again, winding the spool and increasing the tension in the deployment cable 220. At this point, the increased tension has no further rotational effect upon the hinges, since the inner panel arm 200, intermediate arm 300 and base panel arm 250 are already in alignment and flier rotation about the first rotating joint 310 or second rotating joint 320 is prevented by the mechanical limits of the hinge.

In this configuration, the tension of the cable 220 pulls the entire hinge 150 toward the cable spool 230. This motion is resisted by the telescope spring 280. However, when the tension in the cable is increased to a level which overcomes the force of the telescope spring 280, the telescope fitting 260 will begin to slide into the telescope housing 270 toward the spool.

By steadily winding the cable 220 onto the spool 230, this higher tension can be maintained and the entire hinge 150 may be pulled into the telescope housing such that the inner panel 120 slides laterally until it lies snug against the base panel 110. This configuration is shown in FIG. 8.

Once the inner panel is slid to the configuration in FIG. 8, the telescope fitting 260 stops sliding, and the hinge has reached the deployed configuration. The base panel 110 and inner panel 120 are now aligned and adjacent, and they are held in this position by the tension within the deployment cable 220. As long as the tension in the deployment cable is maintained above the level needed to overcome the telescope spring 280, the system will remain in the deployed position. No additional torque is required to hold the panels in the deployed configuration.

In some embodiments it may be advantageous to further secure the system in the deployed configuration through the use of latches or securing bolts (not shown) to hold the hinge in the desired configuration or to maintain the appropriate level of winding of the cable 220 onto the spool 230. Systems that are intended for only a single deployment may also include a spool which is configured to rotate in only one direction, thereby preventing any reversal of the deployment in the event that torque cannot be maintained by the actuator.

Note that in embodiments which are intended only for a single deployment, it is not necessary to provide a telescope spring 280 at all. This is because the mechanical arrangement of the intermediate arm 300 will generally prevent any motion into the telescope housing 270 until the intermediate arm has reached a position which is substantially aligned with the base panel arm 250 (as shown in FIG. 7). Prior to this time, the intermediate arm is disposed substantially at an angle to the telescope housing, and cannot be drawn into the housing without distorting either the arm or housing. Once the intermediate arm has rotated to a position which is substantially aligned with the base panel arm, it may be drawn into the telescope housing without further resistance.

Sequencing

As mentioned above, it is advantageous for the stiffness of the first compression spring 360, the second compression spring 370 and the telescope spring 280 to be different. This allows there to be different levels of tension in the deployment cable which are required to overcome the force of each spring. By selecting the relative stiffness of each spring, it is therefore possible to control the order in which system rotates and translates in response to the increase of tension in the deployment cable 220.

For example, in an alternate design in which it is desired for the rotation about the second rotating joint 320 to take place prior to the rotation about the first rotating joint 310, it is only necessary to use a stiffer spring for the first compression spring 360 than for the second compression spring 370. In this way, the increasing tension in the cable will overcome the force of the second compression spring before it overcomes that of the first compression spring 360, causing the rotation between the intermediate arm 300 and the base panel arm 250 to take place completely before any motion between the inner panel arm 200 and the intermediate arm 300 takes place. Similarly, a hinge system could be configured so that both rotations occur simultaneously by selecting springs of equal stiffness for the first and second compression springs. By choosing the stiffniess of the springs in this way, otherwise identically designed systems can be configured to operate in a different order.

Stowing (Reverse Operation)

If it is desired to adjust the hinge system from the deployed configuration back to the stowed configuration, this can generally be accomplished by relaxing the torque upon the cable spool 230 and allowing the deployment cable 220 to play out from the spool. This action will cause the tension within the cable to drop. At some point, the tension will drop to the point where the force holding the telescope fitting 260 within the telescope housing 270 is less than the force of the telescope spring 280. At this point, the telescope fitting will begin to extend from the telescope housing, moving the system from the deployed configuration shown in FIG. 8 toward the configuration shown in FIG. 7, where the base panel 110 and inner panel 120 are no longer disposed adjacent to one another.

If the cable 220 is played out to maintain this lower tension, the system will eventually reach a position where the telescope fitting 260 is fully extended from the telescope housing 270, as shown in FIG. 7.

If the cable spool 230 is further rotated so as to play out more of the deployment cable 220, the tension in the cable will soon drop below the point required to overcome the force produced by the second compression spring 370. The second compression spring will then begin to rotate the base arm 250 and intermediate arm 300 around the second rotating joint back toward the folded position shown in FIG. 5.

In the shown embodiment, the force provided by the second compression spring 370 between the second tensioning pulley 390 and the first rotating joint 310 pushes directly through the second rotating joint 320 when the system is in the position shown in FIG. 7. As a result, no component of this force will tend to initiate the reverse rotation between the intermediate arm 300 and the base panel arm 250. Therefore, it may be advantageous in embodiments making use of this reverse actuation for there to be some offset between the second tensioning pulley 390 and the first rotating joint 310.

This offset will place the spring 370 at an angle to the hinge 150, causing a component of the force exerted by this spring to induce a rotational moment about the second rotating joint 320. Those of skill in the art will recognize that other means may also be used to initiate such motion. Once this motion is begun, the force of the compression spring 370 will no longer point directly through the second rotating joint, allowing the spring to produce a torque on the intermediate arm about the second rotating joint and drive the remainder of the reverse rotation.

Once the configuration of FIG. 5 is reached, further reduction of the cable tension will allow the inner panel arm 200 and intermediate arm 300 to rotate about the first rotating joint 310 in a manner similar to that described above for the rotation about the second rotating joint 320. This motion will allow the system to rotate until the stowed configuration shown in FIG. 3 is reached. At this point, the system has been completely returned to its original folded state.

Because the sequencing of the motions is controlled by the selection of spring stiffness, the sequence of the motions during stowing will necessarily follow the reverse of the order followed in deploying the system.

Variations

Although the exemplary hinge system illustrated and described above makes use of panels which initially lie adjacent to one another, the system described herein is not limited to such a use. For instance, in another preferred embodiment a similar hinge could be placed between the base panel 110 and the outer panel 130 as shown in FIG. 1. The intermediate arm of such a panel would need to be constructed to a larger dimension in order to span the space occupied by the inner panel 120, but otherwise the mechanism remains the same. The system may still be actuated by a single cable and the system will pull the outer panel 130 snugly against the base panel 110 in the deployed configuration. The telescope housing will need to be dimensioned to accommodate the entire length of the enlarged intermediate arm and hinge mechanism, but the operation and configuration of the system remains the same.

Those of skill in the art will recognize that many variations upon the shape and disposition of panels is possible using the pulley actuated translation hinge mechanism described herein. For instance, more than one panel may be located in between the base panel and a particular folding panel in the stowed configuration. A hinge mechanism substantially as described above but making use of a larger intermediate arm and deeper telescope housing will allow this distance to be spanned in the stowed configuration while still allowing the benefits of the instant invention.

The term "cable" as used herein is intended to refer broadly to a category of elongated flexible structures which may be wound onto and played out from a spool. This includes without limitation structures such as metallic wires, wound or wrapped cables, plastic or organic threads, ropes, chains, belts, tapes and such equivalents to the above as are known. These alternatives may be used in place of, or in combination with, each other as desired wherever "cables" are called for in this design.

Similar variation regarding the structures used as "pulleys" are possible. The term "pulley" as used herein is intended to refer broadly to any type of structure which allows a cable to be threaded over the structure and slide along the structure under tension. This includes without limitation structures such as gears, wheels, cams, and smooth rounded surfaces, as well as more traditional pulleys. The use of any of these structures may advantageously be substituted for a pulley in a particular preferred embodiment of the present design without substantially changing the nature of the described hinge system.

It is also possible to make use of a different number of pulleys or differently located pulleys in designing a particular embodiment of the present invention. For example, one preferred embodiment sharing substantially all of the features described herein can be designed using no pulleys at the first or second rotating joints, and threading the deployment cable from the anchor, over the first tensioning pulley, over the central pulley, over the second tensioning pulley, through the telescope housing and onto the cable spool. The hinge will operate in substantially the same manner. Other variations in placement of pulleys will be apparent to those of skill in the art.

Another preferred embodiment for use with panel arrays which are not intended for reverse actuation in order to return them to the stowed configuration involves removing the telescope spring. As long as the rotation about the second rotating joint does not take place until after the rotation about the first rotating joint is complete, the perpendicular orientation of the intermediate arm with respect to the telescope housing will prevent any motion of the hinge into the telescope housing until the rotation about the second rotating joint is substantially completed. This mechanical limitation upon the motion of the telescope fitting eliminates the need for a telescope spring to bias the telescope fitting to extend from the telescope housing.

The various embodiments of the hinges described above in accordance with the present invention thus provide a means to adjust the configuration of a set of folding panels from a stowed to a deployed configuration. This is accomplished using a single deployment cable and actuator for each hinge. The deployed configuration leaves no gap between panels even when the panels were not disposed adjacent to one another in the stowed configuration.

Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the pulley offset discussed to allow reverse actuation may be adapted for use with hinge systems which span intermediate panels, or for use with hexagonal deployment designs. In addition to the variations described herein, other known equivalents for each feature can be mixed and matched by one of ordinary skill in this art to construct hinge systems and folding panel arrays in accordance with principles of the present invention.

Although this invention has been disclosed in the context of certain preferred embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A hinge mechanism for deploying a folding panel relative to a base panel, comprising:
    a telescope housing mounted within the base panel;
    a telescope fitting slidably mounted within the telescope housing;
    a base arm, attached to the telescope fitting;
    a folding arm, attached to the folding panel;
    an intermediate arm, attached to the folding arm by a first rotating joint and attached to the base arm by a second rotating joint;
    a first tensioning pulley, disposed on the folding arm;
    a second tensioning pulley, disposed on the base arm;
    a folding arm spring, attached to the second rotating joint and the first tensioning pulley;
    a base arm spring, attached to the first rotating joint and the second tensioning pulley;
    a tensioning actuator disposed upon the base panel; and
    a deployment cable, one end of the deployment cable being anchored to the folding panel, threaded over at least the first rotating joint, the first tensioning pulley, the second tensioning pulley, and over the second rotating joint, along the telescope housing and onto the tensioning actuator, the tensioning actuator controlling the tension within the deployment cable and the length of the deployment cable;
    said hinge mechanism being positionable in at least two configurations,
    a stowed configuration, in which the folding arm and intermediate arm are disposed substantially perpendicularly to each other, the intermediate arm and base arm are disposed substantially perpendicularly to each other, and the telescope fitting is substantially extended from the telescope housing, and
    a deployed configuration, in which the folding arm and intermediate arm are disposed substantially linearly with relation to each other, the intermediate arm and base arm are disposed substantially linearly with relation to each other, and the telescope fitting is substantially withdrawn into the telescope housing, and
    the hinge mechanism being adjustable from the stowed configuration to the deployed configuration by increasing the tension applied to the deployment cable by the tensioning actuator, such increase in tension causing the folding arm and intermediate arm to rotate about the first rotating joint and the intermediate arm and base arm to rotate about the second rotating joint and the telescope fitting to slide within the telescope housing.

2. A hinge mechanism as in claim 1 further comprising a telescope spring, attached to the telescope housing and telescope fitting and exerting a force to extend the telescope fitting out of the telescope housing.

3. A hinge mechanism as in claim 2 wherein the deployment cable tension required to overcome the biasing forces of the folding arm spring, base arm spring, and telescope spring are different, so that as tension is increased in the cable, the rotation of the folding arm and intermediate arm about the first rotating joint, the rotation of the intermediate arm and the base arm about the second rotating joint, and the sliding of the telescope fitting within the telescope housing will occur substantially sequentially, rather than simultaneously.

4. A hinge mechanism as in claim 3 wherein during adjustment from the stowed to the deployed configuration the rotation about the first rotating joint occurs before the rotation about the second rotating joint and the rotation about the second rotating joint occurs before the sliding of the telescope fitting into the telescope housing.

5. A hinge mechanism as in claim 1 further comprising a center pulley disposed medially on the intermediate arm, wherein the deployment cable is threaded over the central pulley after the first tensioning pulley and first rotating joint, and before the second tensioning pulley and second rotating joint.

6. A hinge mechanism as in claim 1 wherein the hinge mechanism is further adjustable from the deployed configuration back to the stowed configuration by reducing the tension applied to the deployment cable by the tensioning actuator, such a reduction in tension causing the telescope fitting to extend from the telescope housing and causing the intermediate arm and base arm to rotate about the second rotating joint and causing the intermediate arm and folding arm to rotate about the first rotating joint.

7. A hinge mechanism as in claim 1 wherein the tensioning actuator comprises a spool onto which the deployment cable is wound, said spool being attached to a drive shaft driven by a motor.

* * * * *